Patented Jan. 13, 1942

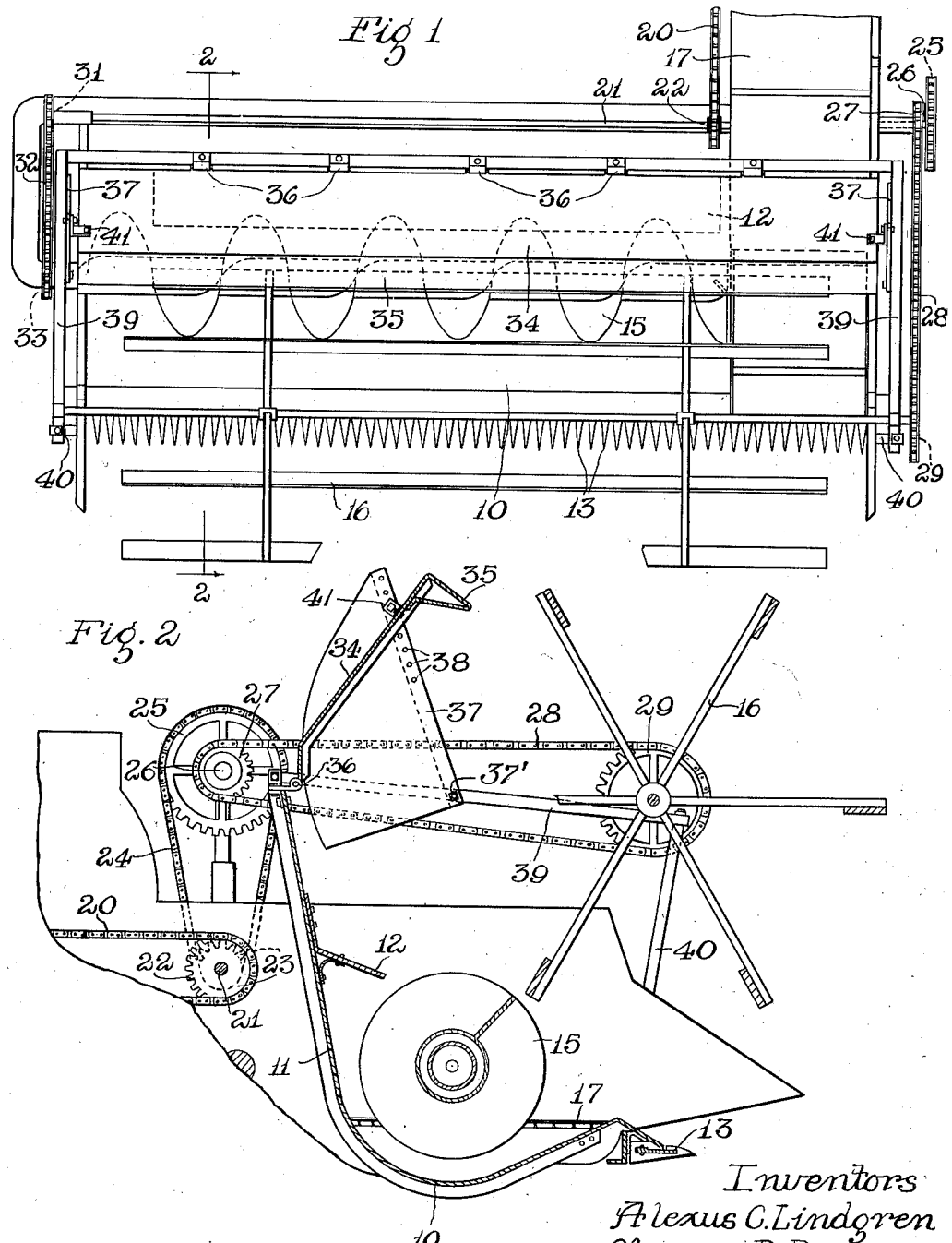

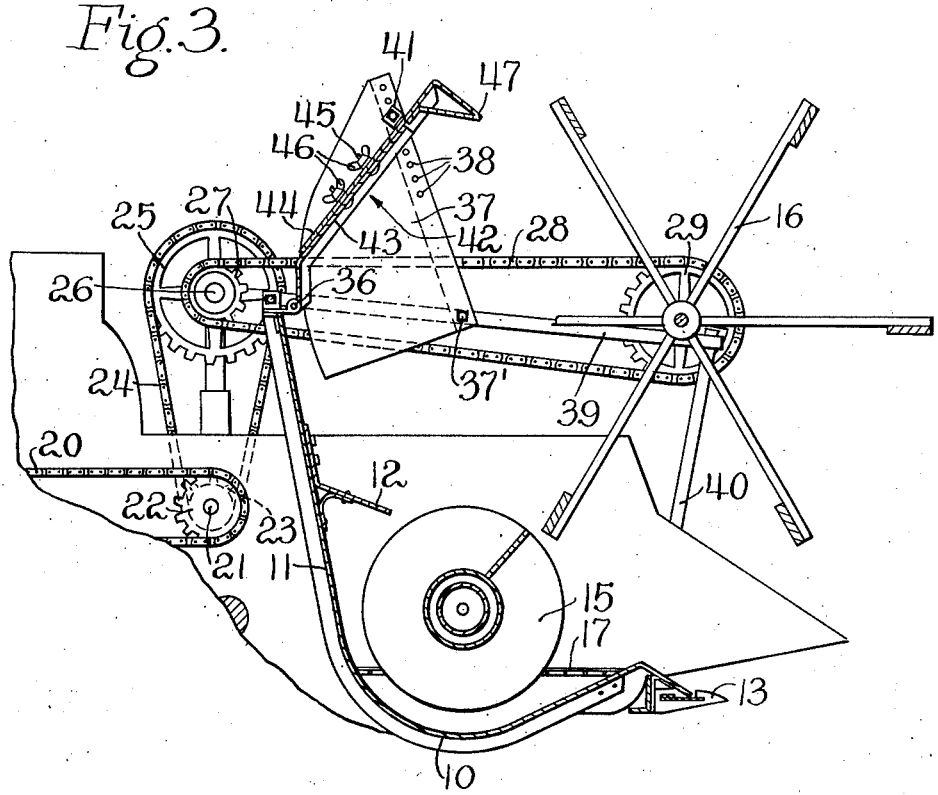

2,270,208

UNITED STATES PATENT OFFICE 2,270,208

HARVESTER CONSTRUCTION

Alexus C. Lindgren, Chicago, and Clemma R. Raney, Riverside, Ill., assignors to International Harvester Company, a corporation of New Jersey Application August 17, 1938, Serial No. 225,338

10 Claims. (Cl. 56—190)

This invention relates to a structure for use in a harvester thresher. More specifically it relates to a shield adapted to prevent the reel and spiral feed of a thresher from throwing cut crops over the backboard.

In harvester threshers of the type which have a crop-receiving platform behind a reciprocating knife and a spiral conveyer extending along the platform, there is considerable danger that some of the crop harvested may be lost because it is thrown out of the back of the platform by the spiral feed and by the reel.

An object is the provision of a shield for the crop-receiving platform of a harvester thresher.

A further object is to provide a shield for a crop-receiving platform which will prevent crops cut from being thrown off in back of the platform.

A further object of the invention is to provide a shield for a crop-receiving platform which will prevent the reel and spiral feed on the platform from throwing the crop off the platform.

According to the present invention, a shield is pivotally mounted on the upper edge of the backboard extending from the crop-receiving platform of a harvester thresher. The platform carries a spiral feed and a reel. Plate members are pivotally mounted on the thresher at the ends of the shield and each carries a series of holes. There is a small angle bracket secured to each end of the shield and adapted to be secured to the plate member in any one of the holes therein. In this way, adjustment of the angle of the shield with respect to the backboard is effected. As an alternative construction, the shield may be made in two sections slidably secured to one another so that the effective width of the shield is varied.

In the drawings—

Figure 1 is a plan view of the crop-receiving platform of a harvester thresher and parts associated therewith;

Figure 2 is a section taken along the line 2—2 of Figure 1; and,

Figure 3 is a section similar to Fig. 2 showing a modified form of shield.

Reference is made to a harvester thresher, but only so much thereof is shown as pertains to the present invention. As part of this harvester thresher, there is a transverse crop-receiving platform 10 having a vertical backboard 11 provided with a shield member 12. At the front of the platform, a knife 13 is positioned. A spiral conveyer 15 is positioned in the platform 10 and extends the length thereof. A reel 16 is mounted over the platform. At one end of the platform is a longitudinal, endless conveyer 17 for feeding cut crop material into a thresher part, not shown.

Driving of the above described parts comes from a sprocket chain 20 which drives a shaft 21 through a gear 22. At one end of the shaft 21 is a gear 23 which drives a sprocket chain 24, which, in turn, drives a gear 25. Drive is transmitted from the gear 25 through a stub shaft 26 to a gear 27 in turn driving a sprocket chain 28. This chain 28 drives the gear 29 of the reel 16. At the opposite end of the shaft 21 is mounted a gear 31, which drives a chain 32 in turn driving a gear 33 on the spiral feed 15.

The novel shielding mechanism will now be described. A shield 34, having an edge portion 35 bent at right angles to the shield, is pivotally mounted at the top of the backboard 11 by a plurality of hinges 36. There is a plate member 37 at each end of the shield 34 having a plurality of holes 38 along one edge and being pivotally supported by means of a bolt 37' on a horizontal member 39 carried at one end on the backboard and at the other end on a vertical member 40 secured to the frame of the machine. Each end of the shield 34 is secured to the plate member 37 by means of an angle bracket piece 41, which is bolted to the shield at the plate member through any of the holes 38. Since the bracket piece 41 may be secured to any one of a number of holes 38, angular adjustment of the shield 34 with respect to the plate member 37 and the backboard 11 is had.

In the modification shown in Figure 3, a shield 42 is formed of two overlapping plates 43 and 44, the amount of overlap of which may be varied to vary the width of the shield. The plates are held together by bolts 45 and wing nuts 46. One edge 47 of the plate 44 extends at right angles to the body of the plate similar to the edge 35 of the plate 34. An angle bracket piece 41 is attached at each end of the shield 42 for securement to the plate members 37.

In operation, grain or other crops are cut by the knife 13 and pushed by the reel 16 onto the crop-receiving platform 10. They are moved along this platform by the spiral conveyer 15 to the endless conveyer 17. Because of the action of the reel 16 and the spiral conveyer 15, the grain may possibly be thrown over the backboard. The shield member 12 prevents this to some extent. The novel adjustable shield 34 prevents this wasting of grain completely.

It will be apparent from the foregoing description that a novel construction has been provided, which includes an adjustable shield and end members therefor, the shield being fixed to the backboard of a harvester thresher.

The intention is to limit the invention only by the terms of the appended claims.

What is claimed is:

1. In a harvester thresher, shielding means for a crop-receiving platform having a spiral feed extending therealong and a backboard, said means comprising a shield pivotally mounted on the edge of the backboard, plate members at the ends of the shield extending at substantially right angles thereto and pivotally supported on the platform at points spaced from the pivotal mounting of the shield on the backboard, each of said end members having a plurality of holes therein, and securing means attached to the shield and adapted to cooperate with any of the openings in the plate members for securing the shield in any one of a plurality of angular positions with respect to the backboard.

2. In a harvester thresher, shielding means for a crop-receiving platform having a backboard, said shielding means comprising a shield pivotally mounted on an axis along an edge of the backboard, plate members at each end of the shield extending at right angles to the shield and pivotally mounted at points on the platform spaced from the pivot axis of the shield, each of said plate members having a plurality of holes and angle members secured to the shield at its ends and being secureable to the plate members through any of the holes therein for fixing the shield in any of a plurality of angular positions with respect to the backboard.

3. In a harvester thresher, shielding means for a crop-receiving platform having a spiral feed extending therealong and a backboard, said shielding means comprising a shield pivotally mounted on the edge of the backboard and plate members at the ends of the shield pivoted on the platform at points off the pivot axis of the shield and being fixable with respect to the shield in a plurality of positions for varying the angle of the shield with respect to the backboard.

4. In a harvester thresher, shielding means for a crop-receiving platform having a substantially vertically disposed rigid backboard, said shielding means comprising a shield pivotally mounted on the top of the backboard, and plate members positioned at the ends of the shield and having means for securing the shield in a plurality of positions for varying the angle of the shield with respect to the backboard.

5. In combination, a crop-receiving platform having a substantially vertically disposed rigid backboard and a shield for the platform pivotally secured at the edge of the backboard, and means connected with the platform for securing the shield in any one of a plurality of angular positions with respect to the backboard.

6. In a harvester thresher, a platform, a substantially vertically disposed rigid backboard, a shield pivoted on the backboard, and end members adjustably secured to the shield.

7. In a harvester thresher having a crop-receiving platform and a spiral feed extending therealong, a backboard, a shield adjustably mounted at the top of the backboard, and plate members secured at the end of the shield.

8. In combination, a crop-receiving platform having a backboard, a reel supported on the platform, a shield extending from the backboard adjacent the reel, said shield comprising two plates, means for slidably adjusting one of said plates with respect to the other plate, means for adjusting the shield with respect to the backboard and the reel, and means for securing the shield in any of its adjusted positions.

9. In combination, a crop-receiving platform having a backboard, a reel supported on the platform, a shield pivoted on the backboard, said shield having a flange along an edge thereof and means connected with the platform and the shield for securing the shield in any one of a plurality of angular positions with respect to the backboard.

10. In combination, a crop-receiving platform having a backboard, a reel supported on the platform, a shield pivoted on the backboard, said shield having a grain retaining portion extending outwardly over the platform near the path of the reel, and members adjusably secured to the shield and the platform for securing the shield in any one of a plurality of angular positions with respect to the backboard.

ALEXUS C. LINDGREN.
CLEMMA R. RANEY.